United States Patent
Numata et al.

(10) Patent No.: US 12,001,048 B2
(45) Date of Patent: Jun. 4, 2024

(54) DISPLAY DEVICE

(71) Applicant: Japan Display Inc., Tokyo (JP)

(72) Inventors: Yudai Numata, Tokyo (JP); Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/328,857

(22) Filed: Jun. 5, 2023

(65) Prior Publication Data

US 2023/0305220 A1 Sep. 28, 2023

Related U.S. Application Data

(63) Continuation of application No. 17/884,975, filed on Aug. 10, 2022, now Pat. No. 11,719,877, which is a
(Continued)

(30) Foreign Application Priority Data

Oct. 10, 2018 (JP) .................................. 2018-191817

(51) Int. Cl.
*F21V 8/00* (2006.01)
*G02F 1/1333* (2006.01)
(Continued)

(52) U.S. Cl.
CPC ......... *G02B 6/0088* (2013.01); *G02B 6/0055* (2013.01); *G02B 6/0075* (2013.01); *G02B 6/0091* (2013.01); *G02F 1/133331* (2021.01); *G02F 1/133615* (2013.01); *G02F 1/133616* (2021.01); *G02B 6/0068* (2013.01); *G02F 1/13347* (2021.01)

(58) Field of Classification Search
CPC .............. G02B 6/008; G02F 1/133614; G02F 1/133615; G02F 1/133331
See application file for complete search history.

(56) References Cited

U.S. PATENT DOCUMENTS 6,229,585 B1 5/2001 Yanagi
11,448,819 B2 9/2022 Numata et al.
(Continued)

FOREIGN PATENT DOCUMENTS

JP 2003-066418 A 3/2003
JP 2004-309774 A 11/2004
(Continued)

OTHER PUBLICATIONS

Notice of Reasons for Refusal dated Mar. 7, 2023 in corresponding Japanese Application No. 2022-127049, 6 pages.

*Primary Examiner* — Jessica M Merlin
(74) *Attorney, Agent, or Firm* — Maier & Maier, PLLC

(57) ABSTRACT

According to one embodiment, a display device includes a first transparent substrate including a first main surface, a second transparent substrate including a first end portion, a liquid crystal layer containing strip-shaped polymers and liquid crystal molecules, a third transparent substrate including a second end portion and a second main surface, a first light-emitting element and a first light guide. The first light guide includes a first surface and a second surface. A height from the first main surface to the second surface is less than a height from the first main surface to the second main surface.

8 Claims, 16 Drawing Sheets

Related U.S. Application Data continuation of application No. 17/221,868, filed on Apr. 5, 2021, now Pat. No. 11,448,819, which is a continuation of application No. PCT/JP2019/038397, filed on Sep. 27, 2019.

(51) Int. Cl.
  *G02F 1/1334* (2006.01)
  *G02F 1/1335* (2006.01)
  *G02F 1/13357* (2006.01)

(56) References Cited

U.S. PATENT DOCUMENTS

| | | |
|---|---|---|
| 2006/0216434 A1 | 9/2006 | Okuyama et al. |
| 2009/0185100 A1* | 7/2009 | Matsuhira ............ G02B 6/005 361/679.01 |
| 2010/0085510 A1 | 4/2010 | Okuyama et al. |
| 2012/0002139 A1* | 1/2012 | Nakajima ............ G02B 6/0028 349/65 |
| 2016/0070047 A1 | 3/2016 | Okuyama et al. |
| 2018/0149795 A1 | 5/2018 | Lee et al. |

FOREIGN PATENT DOCUMENTS

| | | |
|---|---|---|
| JP | 2010092682 A | 4/2010 |
| JP | 2016057338 A | 4/2016 |
| WO | 2010092791 A1 | 8/2010 |

\* cited by examiner

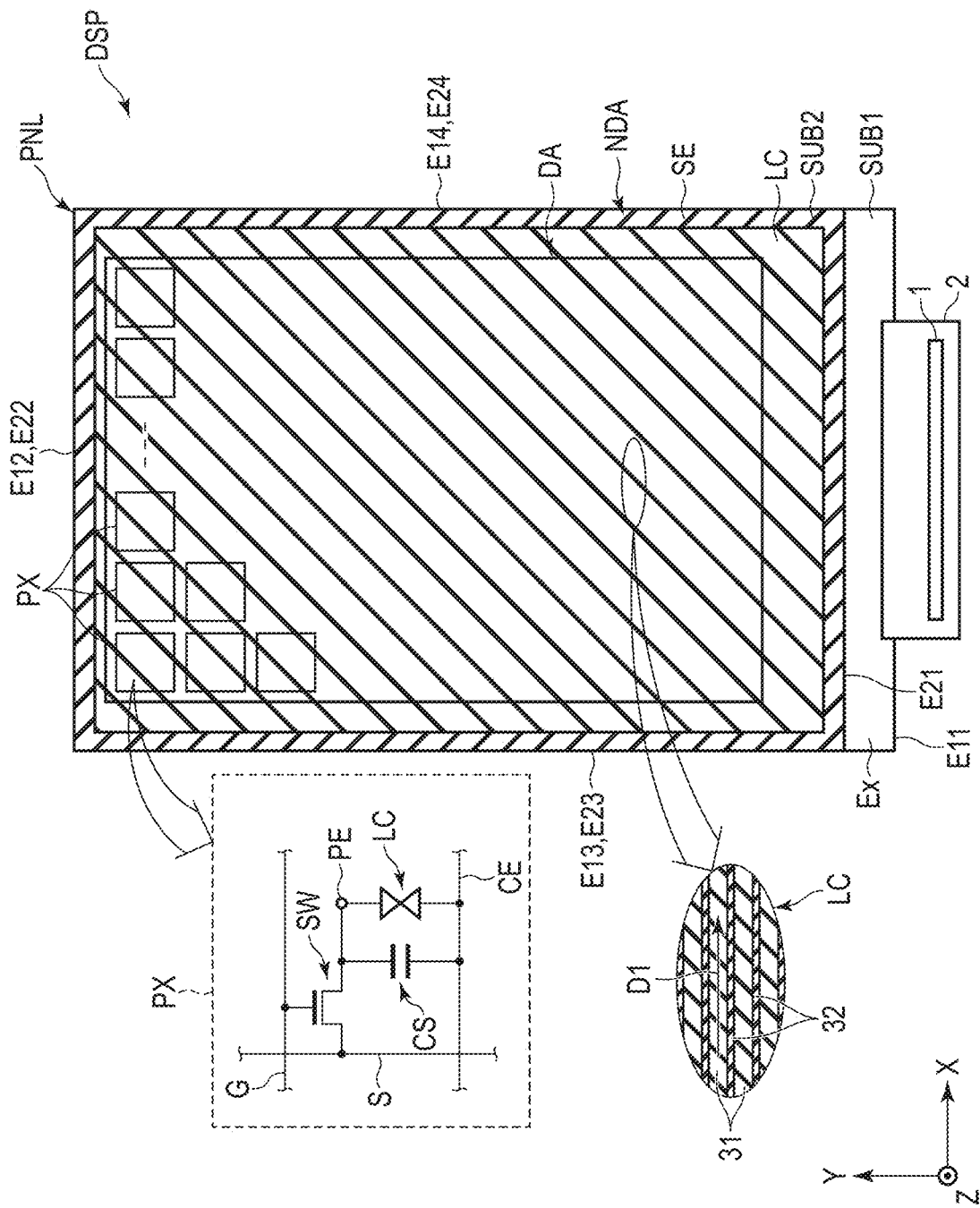
F I G. 1

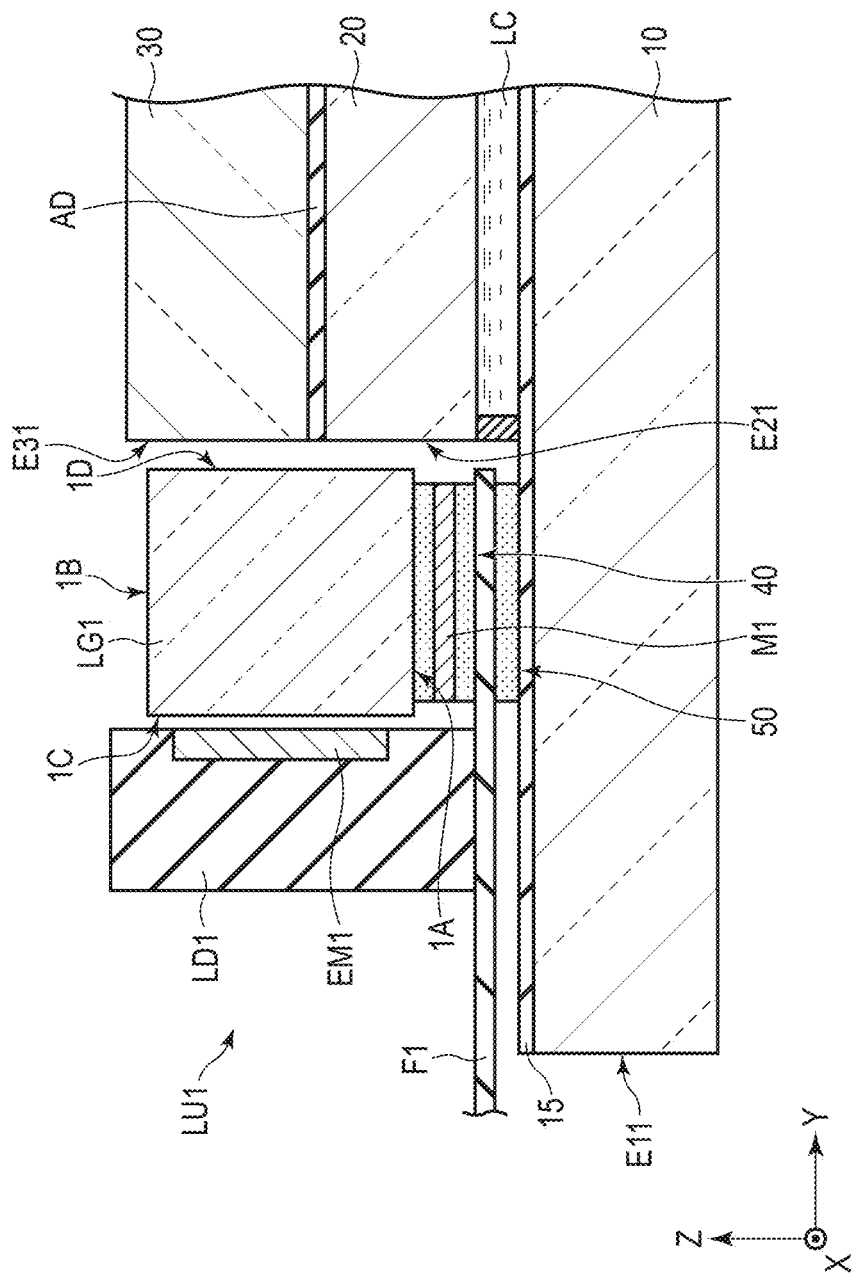
F I G. 6

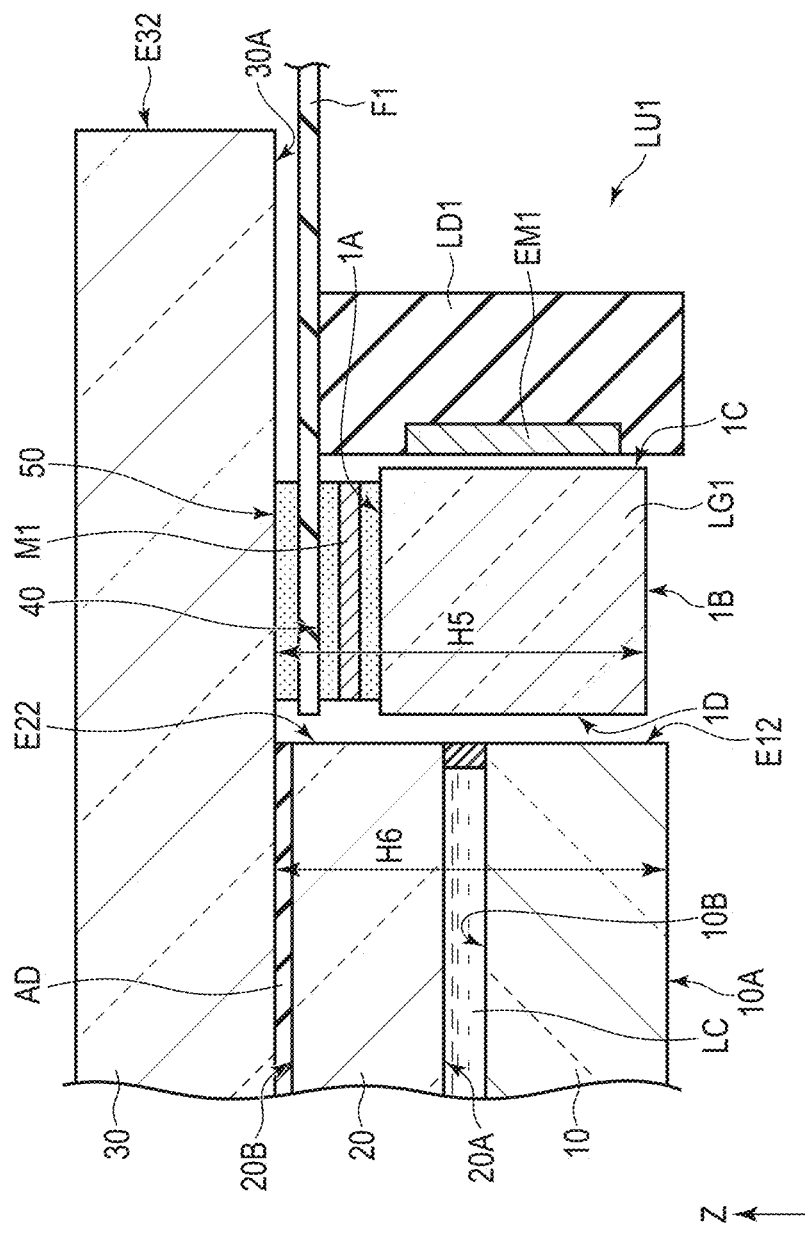
F I G. 8

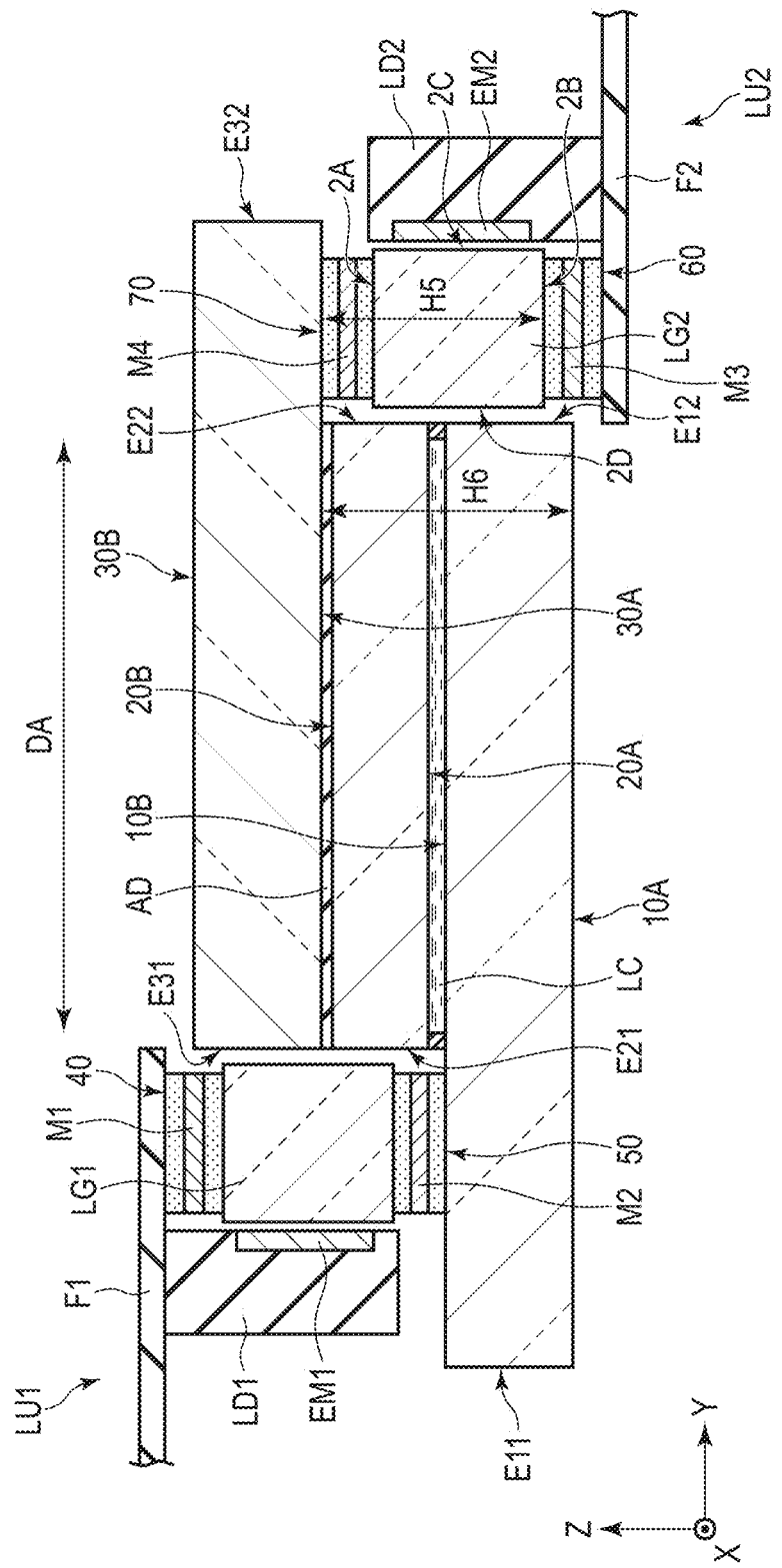
F I G. 9

DISPLAY DEVICE

CROSS-REFERENCE TO RELATED APPLICATIONS

This application is a Continuation Application of U.S. patent application Ser. No. 17/884,975 filed on Aug. 10, 2022, which is continuation of U.S. patent application Ser. No. 17/221,868 filed on Apr. 5, 2021, which is a continuation of PCT Application No. PCT/JP2019/038397, filed Sep. 27, 2019 and based upon and claiming the benefit of priority from Japanese Patent Application No. 2018-191817, filed Oct. 10, 2018, the entire contents of all of which are incorporated herein by reference.

FIELD

Embodiments described herein relate generally to a display device.

BACKGROUND

Recently, various modes of display devices have been proposed. For example, such an illumination device is disclosed, that comprises a light modulating layer containing a bulk having optical anisotropy and micro-particles in a light modulating element attached to a light guide. In another example, such a light source device is disclosed, that comprises an optical converter unit containing polymer dispersed liquid crystal and converting the intensity of incident light. Further, in another example, a display device is disclosed, in which a light source and a light guide are attached to a frame, which is provided on a side of a liquid crystal panel.

BRIEF DESCRIPTION OF THE DRAWINGS

FIG. 1 is a plan view showing a configuration example of a display device DSP according to an embodiment.

FIG. 6 is a cross-sectional view showing still another configuration example of the display device DSP.

FIG. 8 is a cross-sectional view showing still another configuration example of the display device DSP.

FIG. 9 is a cross-sectional view showing still another configuration example of the display device DSP.

DETAILED DESCRIPTION

Figure 2:
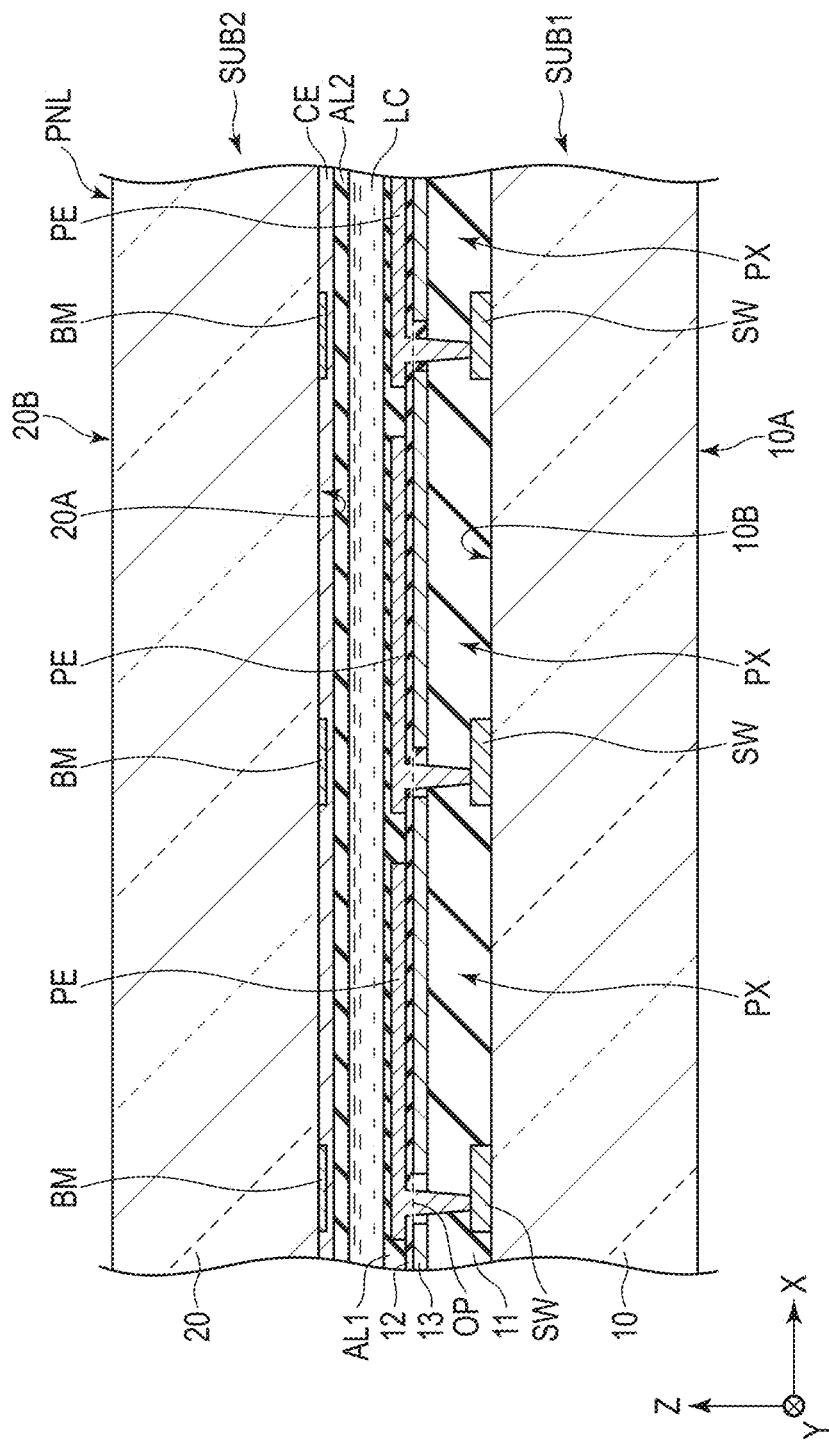
FIG. 2 is a cross-sectional view showing a configuration example of a display panel PNL shown in FIG. 1.

In general, according to one embodiment, there is provided a display device comprising a first transparent substrate comprising a first main surface, a second transparent substrate comprising a first end portion and opposing the first main surface, a liquid crystal layer located between the first transparent substrate and the second transparent substrate and containing strip-shaped polymers and liquid crystal molecules, a third transparent substrate comprising a second end portion and a second main surface on an opposite side to a surface opposing the second transparent substrate, and adhered to the second transparent substrate, a first light-emitting element opposing the first end portion and the second end portion and a first light guide overlapping the first main surface and located between the first and second end portions and the first light-emitting element. The first light guide comprises a first surface opposing the first main surface and a second surface on an opposite side to the first surface. A height from the first main surface to the second surface is less than a height from the first main surface to the second main surface.

According to another embodiment, there is provided a display device comprising a first transparent substrate comprising a first end portion, a first main surface and a second main surface on an opposite side to the first main surface, a second transparent substrate comprising a second end portion and opposing the second main surface, a liquid crystal layer located between the first transparent substrate and the second transparent substrate and containing strip-shaped polymers and liquid crystal molecules, a third transparent substrate adhered to the second transparent substrate and comprising a third main surface, a first light-emitting element opposing the first end portion and the second end portion and a first light guide overlapping the third main surface and located between the first and second end portions and the first light-emitting element. The first light guide comprises a first surface opposing the third main surface and a second surface on an opposite side to the first surface. A height from the third main surface to the second surface is less than a height from the third main surface to the first main surface.

According to still another embodiment, there is provided a display device comprising a first transparent substrate comprising a first main surface, a second transparent substrate comprising a first end portion and a second main surface on an opposite side to a surface opposing the first transparent substrate, a liquid crystal layer located between the first transparent substrate and the second transparent substrate and containing strip-shaped polymers and liquid crystal molecules, a first light-emitting element opposing the first end portion and a first light guide overlapping the first main surface and located between the first end portion and the first light-emitting element. The first light guide comprises a first surface opposing the first main surface and a second surface on an opposite side to the first surface. A height from the first main surface to the second surface is less than a height from the first main surface to the second main surface.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

FIG. 1 is a plan view showing a configuration example of a display device DSP according to the embodiment. For example, a first direction X, a second direction Y and a third direction Z are orthogonal to each other, but may intersect at an angle other than ninety degrees. The first direction X and the second direction Y correspond to the directions parallel to a main surface of a substrate which constitutes the display device DSP, and the third direction Z corresponds to the thickness direction of the display device DSP. In the following explanations, a direction from the first substrate SUB1 toward the second substrate SUB2 is referred to as upward (or merely above), and a direction from the second substrate SUB2 toward the first substrate SUB1 is referred to as downward (or merely below). With such expressions as "a second member above a first member" and "a second member below a first member", the second member may be in contact with the first member or may be remote from the first member. In addition, an observation position at which the display device DSP is observed is assumed to be located on the tip side of the arrow indicating the third direction Z, and viewing from the observation position toward an X-Y plane defined by the first direction X and the second direction Y is called a plan view.

In the embodiment, a liquid crystal display device employing polymer dispersed liquid crystal applied thereto will be explained as an example of the display device DSP. The display device DSP comprises a display panel PNL, an IC chip 1 and a wiring substrate 2.

The display panel PNL comprises a first substrate SUB1, a second substrate SUB2, a liquid crystal layer LC and a sealant SE. The first substrate SUB1 and the second substrate SUB2 are each formed into a flat plate parallel to the X-Y plane. The first substrate SUB1 and the second substrate SUB2 overlap in plan view. The first substrate SUB1 and the second substrate SUB2 are adhered to each other by a sealant SE. The liquid crystal layer LC is held between the first substrate SUB1 and the second substrate SUB2, and sealed by the sealant SE. In FIG. 1, the liquid crystal layer LC and the sealant SE are indicated by different hatch lines.

As shown schematically and enlarged in FIG. 1, the liquid crystal layer LC comprises a polymer dispersed liquid crystal which contains polymers 31 and liquid crystal molecules 32. For example, the polymer 31 is a liquid crystal polymer. The polymers 31 extend into a strip shape. An extending direction D1 of the polymers 31 is parallel to the first direction X. The liquid crystal molecules 32 are dispersed in gaps between the polymers 31 and aligned such that their longitudinal axes extend in the first direction X. The polymers 31 and the liquid crystal molecules 32 each have optical anisotropy or refractive anisotropy. The response performance of the polymers 31 to the electric field is lower than the response performance of the liquid crystal molecules 32 to the electric field.

For example, the orientation of alignment of the polymers 31 is hardly varied regardless of the presence or absence of an electric field. On the other hand, the orientation of alignment of the liquid crystal molecules 32 is varied in accordance with the electric field in a state where a voltage higher than the threshold value is applied to the liquid crystal layer LC. While voltage is not applied to the liquid crystal layer LC, the optical axes of the polymers 31 and the liquid crystal molecules 32 are parallel to each other and light entering the liquid crystal layer LC is transmitted without being substantially scattered in the liquid crystal layer LC (a transparent state). While voltage is applied to the liquid crystal layer LC, the optical axes of the polymers 31 and the liquid crystal molecules 32 intersect each other, and light entering the liquid crystal layer LC is scattered in the liquid crystal layer LC (a scattering state).

The display panel PNL includes a display part DA which displays images and a frame-shaped non-display part NDA surrounding the display part DA. The display part DA comprises pixels PX arranged in a matrix form in the first direction X and the second direction Y. The sealant SE is located in the non-display part NDA.

As enlargedly shown in FIG. 1, each of the pixels PX comprises a switching element SW, a pixel electrode PE, a common electrode CE, a liquid crystal layer LC, and the like. The switching element SW is formed of, for example, a thin-film transistor (TFT) and is electrically connected to the scanning line G and the signal line S. The scanning line G is electrically connected to the switching element SW in each of pixels PX which are arranged in the first direction X. The signal line S is electrically connected to the switching element SW in each of pixels PX which are arranged in the second direction Y. The pixel electrode PE is electrically connected to the switching element SW. Each of the pixel electrodes PE opposes the common electrode CE, and drives the liquid crystal layer LC (particularly, the liquid crystal molecules 32) by an electric field generated between the pixel electrode PE and the common electrode CE. A capacitor CS is formed, for example, between an electrode having the same potential as that of the common electrode CE and an electrode having the same potential as that of the pixel electrode PE.

The first substrate SUB1 includes end portions E11 and E12 extending in the first direction X, and end portions E13 and E14 extending in the second direction Y. The second substrate SUB2 includes end portions E21 and E22 extending in the first direction X, and end portions E23 and E24 extending in the second direction Y. In the example illustrated, the end portion E12 and the end portion E22 overlap each other, the end portions E13 and E23 overlap each other, and the end portions E14 and E24 overlap each other, in plan view. The end portion E21 is located between the end portion E11 and the display part DA in plan view. The first substrate SUB1 includes an extending portion Ex between the end portions E11 and E21.

The wiring substrate 2 is electrically connected to the extending portion Ex. The wiring substrate 2 is a flexible printed circuit board which can be bent. The IC chip 1 is electrically connected to the wiring substrate 2. The IC chip 1 contains, for example, a display driver DD incorporated therein, which outputs signals necessary to display images. Note that the IC chip 1 may be electrically connected to the extending portion Ex. In some cases, the IC chip 1 and the wiring substrate 2 read signals from the display panel PNL, but it mainly functions as a signal source supplying signals to the display panel PNL.

FIG. 2 is a cross-sectional view showing a configuration example of the display panel PNL shown in FIG. 1. The first substrate SUB1 comprises a transparent substrate 10, an insulating film 11, an insulating film 12, a capacitor electrode 13, switching elements SW, pixel electrodes PE and an alignment film AL1. The first substrate SUB1 further comprises scanning lines G and signal lines S shown in FIG. 1. The transparent substrate 10 comprises a main surface (a lower surface) 10A and another main surface (an upper surface) 10B on an opposite side to the main surface 10A. The switching elements SW are disposed on the main surface 10B. The insulating film 11 covers the switching elements SW. The capacitor electrode 13 is located between the insulating film 11 and the insulating film 12. The pixel electrodes PE are disposed on the insulating film 12 such that each electrode is for the respective pixel PX. The pixel electrodes PE are electrically connected to the switching elements SW, respectively, via respective opening portions OP of the capacitor electrode 13. The pixel electrodes PE overlap the capacitor electrode 13 via the insulating film 12 and they each form a capacitor CS of the respective pixel PX. The alignment film AL1 covers the pixel electrodes PE.

The second substrate SUB2 comprises a transparent substrate 20, light-shielding layers BM, a common electrode CE and an alignment film AL2. The transparent substrate 20 comprises a main surface (a lower surface) 20A and another main surface (an upper surface) 20B on an opposite side of the main surface 20A. The main surface 20A of the transparent substrate 20 opposes the main surface 10B of the transparent substrate 10. The light-shielding layer BM and the common electrode CE are disposed on the main surface 20A. The light-shielding layers BM are located, for example, directly above the switching elements SW, respectively and directly above the scanning lines G and the signal lines S, respectively. The common electrode CE are disposed over a plurality of pixels PX and directly covers the light-shielding layers BM. The common electrode CE is electrically connected to the capacitor electrodes 13 and at the same potential as that of the capacitor electrodes 13. The alignment film AL2 covers the common electrode CE. The liquid crystal layer LC is located between the main surface 10B and the main surface 20A, and is in contact with the alignment films AL1 and AL2. In the first substrate SUB1, the insulating film 11, the insulating film 12, the capacitor electrodes 13, the switching elements SW, the pixel electrodes PE and the alignment film AL1 are located between the main surface 10B and the liquid crystal layer LC. In the second substrate SUB2, the light-shielding layers BM, the common electrode CE and the alignment film AL2 are located between the main surface 20A and the liquid crystal layer LC.

The transparent substrates 10 and 20 are insulating substrates such as of glass or plastic. The main surfaces 10A and 10B and the main surfaces 20A and 20B are surfaces substantially parallel to the X-Y plane. The insulating film 11 is formed from a transparent insulation material such as of silicon oxide, silicon nitride, silicon oxynitride, acryl resin or the like. For example, the insulating film 11 includes an inorganic insulating film and an organic insulating film. The insulating film 12 is an inorganic insulating film such as of silicon nitride or the like. The capacitor electrodes 13, the pixel electrodes PE and the common electrode CE are transparent electrodes made of a transparent conductive material such as indium tin oxide (ITO), indium zinc oxide (IZO) or the like. For example, the light-shielding layers BM are conductive layers having a resistance lower than that of the common electrode CE. For example, the light-shielding layers BM are formed of a non-transparent metal material such as molybdenum, aluminum, tungsten, titanium, silver or the like. The alignment films AL1 and AL2 are horizontal alignment films substantially parallel to the X-Y plane, which have an alignment restriction force. For example, the alignment films AL1 and AL2 are subjected to an alignment treatment in the first direction X. Note that the alignment treatment may be a rubbing treatment or an optical alignment treatment.

Figure 3:
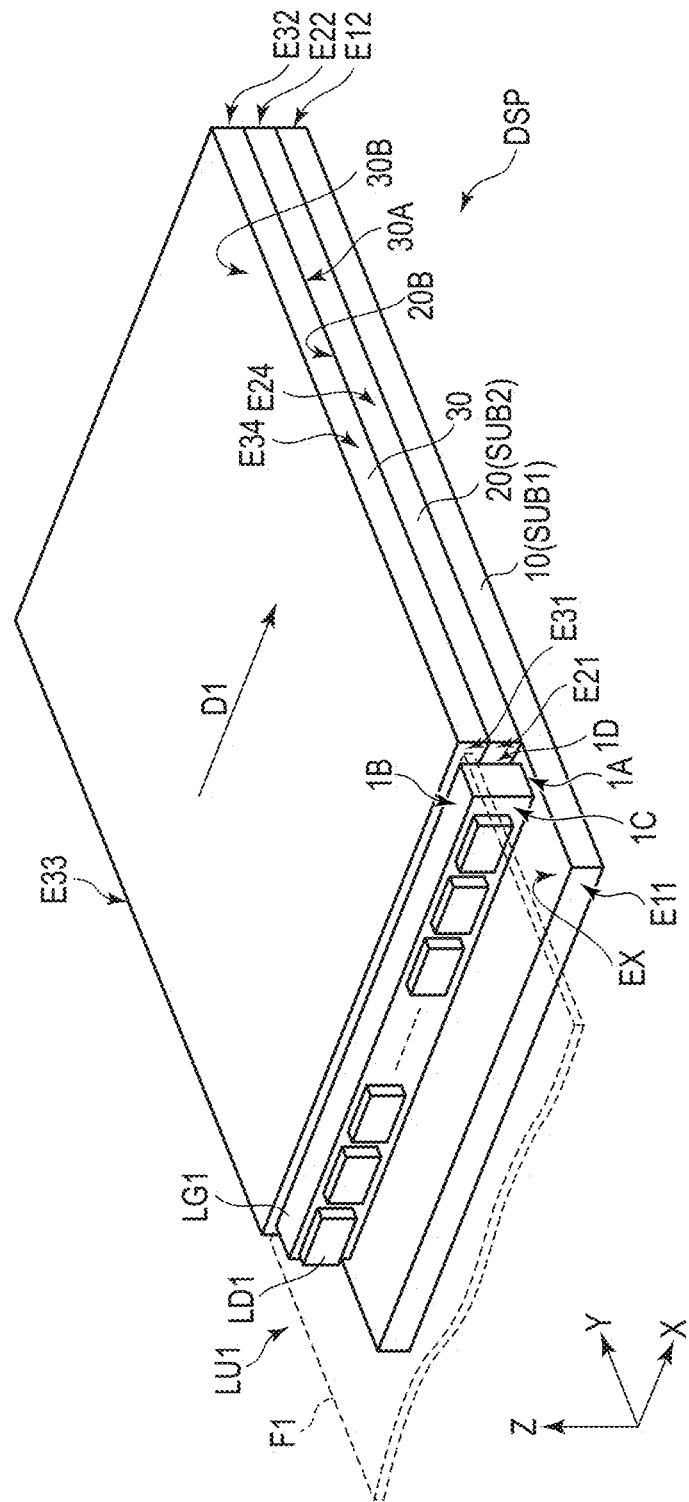
FIG. 3 is a perspective view showing a main part of the display device DSP shown in FIG. 1.

FIG. 3 is a perspective diagram showing a main part of the display device DSP shown in FIG. 1. The display device DSP comprises a transparent substrate 30 and light source unit LU1 in addition to the display panel PNL. The light source unit LU1 is located in the extending portion Ex. The transparent substrate 10, the transparent substrate 20 and the transparent substrate 30 are arranged in this order in the third direction Z.

The transparent substrate 30 is formed of, for example, transparent glass or a transparent resin such as polymethyl methacrylate (PMMA), polycarbonate (PC), or the like. The transparent substrate 30 comprises a main surface (a lower surface) 30A, another main surface (a upper surface) 30B on an opposite side to the main surface 30A, end portions E31 and E32 extending in the first direction X and end portions E33 and E34 extending in the second direction Y. The main surface 30A opposes the main surface 20B of the transparent substrate 20. In the example illustrated, the end portion E31 overlaps the end portion E21, and the end portion E32 overlaps the end portion E22. Note that the end portion E32 may not necessarily overlap the end portion E22.

The light source units LU1 each comprise a plurality of light-emitting elements LD1, a light guide LG1 and a wiring substrate F1. The light-emitting elements LD1 are arranged in the extending direction D1 of polymer 31 shown in FIG. 1 with intervals respectively therebetween. The light-emitting elements LD1 are connected to the wiring substrate F1. The light-emitting elements LD1 are located between the transparent substrate 10 and the wiring substrate F1. The light-emitting elements LD1 oppose the end portion E21 of the transparent substrate 20 and the end portion E31 of the transparent substrate 30. The light-emitting elements LD1 are, for example, light-emitting diodes. Light irradiated from the light-emitting elements LD1 proceeds in a direction of an arrow indicating the second direction Y.

The light guide LG1 is formed into a rectangular parallelepiped shape elongated along the first direction X. The light guide LG1 is located between the transparent substrates 20 and 30 and the light-emitting elements LD1. The light guide LG1 comprises a surface (a lower surface) 1A, another surface (an upper surface) 1B on an opposite side to the surface 1A, another surface 1C and another surface 1D on an opposite side to the surface 1C. The surface 1A opposes the transparent substrate 10, the surface 1B opposes the wiring substrate F1, the surface 1C opposes the light-emitting elements LD1, and the surface 1D opposes the transparent substrates 20 and 30. For example, each of the surfaces 1A and 1B is a flat surface parallel to the X-Y plane defined by the first direction X and the second direction Y. In other words, the surfaces 1A and 1B are parallel to each other. Each of the surfaces 1C and 1D is a flat surface parallel to the X-Z plane defined by the first direction X and the third direction Z. Note that the surfaces 1C and 1D may be irregular surfaces with projections and recesses or the surfaces 1C and 1D may not necessarily parallel to each other.

Figure 4:
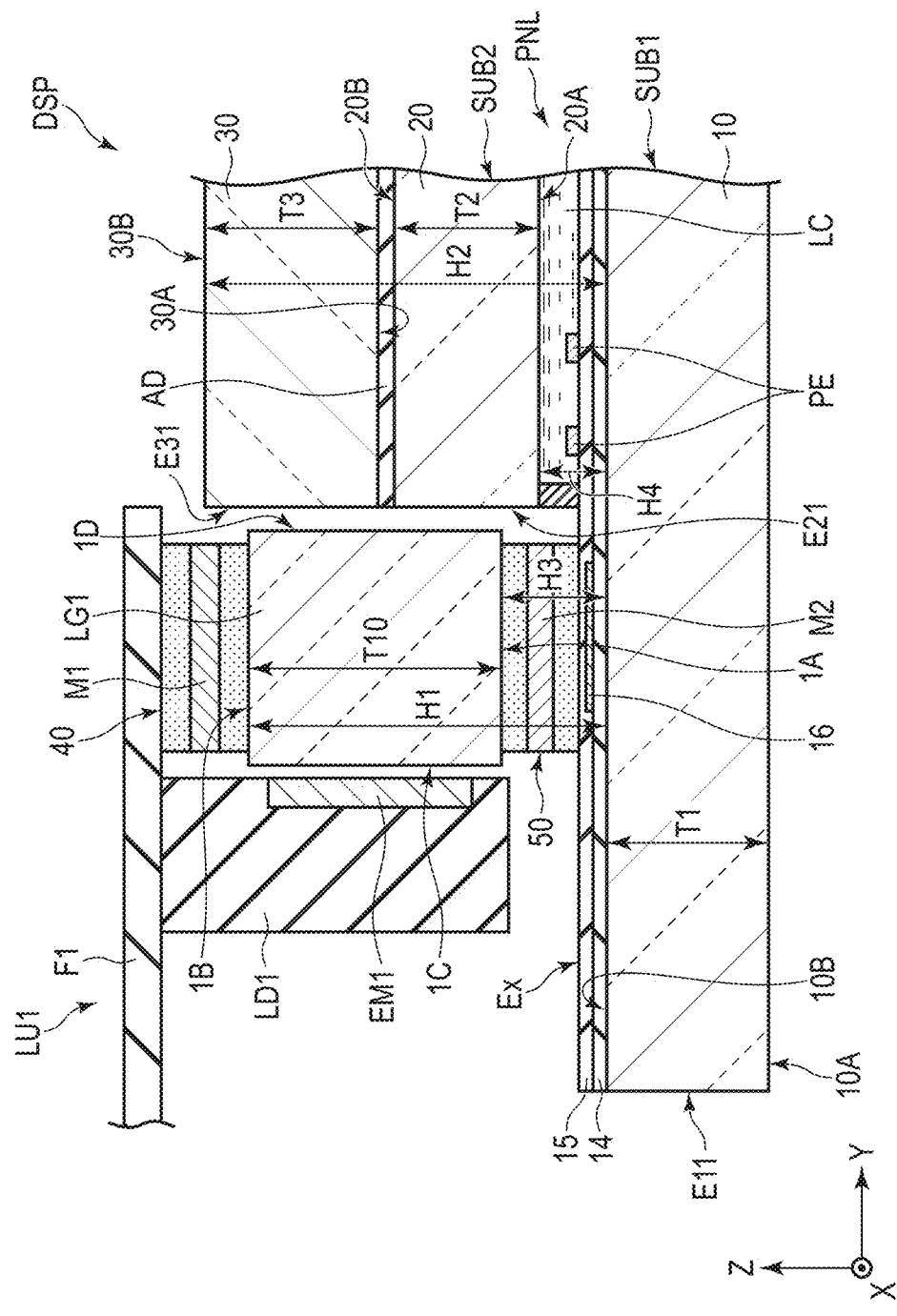
FIG. 4 is an enlarged cross-sectional view showing an extending portion Ex of the display device DSP shown in FIG. 3.

FIG. 4 is an enlarged cross-sectional view showing the extending portion Ex and its surroundings of the display device DSP shown in FIG. 3. Note that, as to the display panel PNL, only a main part is illustrated. The display device DSP further comprises an adhesive layer 40, another adhesive layer 50 and a transparent adhesive layer AD.

The first substrate SUB1 further comprises an insulating film 14, an insulating film and metal wiring line 16. The insulating film 14 is located on the main surface 10B. The metal wiring line 16 is located on the insulating film 14, and is covered by the insulating film 15. The insulating film 15 is equivalent to the insulating film 11 or 12 shown in FIG. 2. The metal wiring line 16 is formed of, for example, the same material as that of the scanning lines G or the signal lines S.

The light-emitting elements LD1 each comprise a light-emitting portion EM1 opposing the surface 1C of the light guide LG1. The light-emitting portion EM1 is spaced apart from the surface 1C. The light-emitting portion EM1 comprises a red light-emitting unit, a green light-emitting unit and a blue light-emitting unit. These color light-emitting portions are provided in the light-emitting portion EM1, but these may not necessarily be located on the same straight line in the first direction X. In other words, these color light-emitting units may be provided at positions different from each other in height from the first substrate SUB1 in the third direction Z. The light-emitting portion EM1 is located between the surface 1A and the surface 1B of the first light guide LG1 in the third direction Z.

The adhesive layer 40 adheres the wiring substrate F1 and the light guide LG1 together. In the example illustrated, the adhesive layer 40 is located between the surface 1B and the wiring substrate F1. The adhesive layer 50 adheres the light source units LU1 and the first substrate SUB1 together. In the example illustrated, the adhesive layer 50 is located between the surface 1A and the main surface 10B, and adheres the first light guide LG1 and the insulating film 15 together. Thus, the light source unit LU1 is fixed to the first substrate SUB1.

The adhesive layer 40 comprises a reflective member M1 and the adhesive layer 50 comprises a reflective member M2. The reflective member M1 is located between the wiring substrate F1 and the surface 1B. The reflective member M2 is located between the insulating film 15 and the surface 1A. The adhesive layers 40 and 50 each are a stacked layer body in which, for example, an adhesive material, a reflective member and an adhesive material are stacked in this order, and are, for example, double-sided tapes. The reflective members M1 and the M2 are each formed of, for example, a highly reflective metallic material such as aluminum, molybdenum, titanium, silver or the like. Note that the reflective members M1 and the M2 may be light-shielding members as well.

The transparent adhesive layer AD is located between the main surface 20B and the main surface 30A. The transparent adhesive layer AD is in contact with each of the main surface 20B and the main surface 30A substantially in its entirety, and adheres the transparent substrate 20 and the transparent substrate 30 together.

Here, the positions of the light guide LG1, the transparent substrate 10, the transparent substrate 20 and the transparent substrate 30 in relation to each other will be focused.

The transparent substrate 10 has a thickness T1, the transparent substrate 20 has a thickness T2, the transparent substrate 30 has a thickness T3, and the light guide LG1 has a thickness T10. Note that the term "thickness" in this specification is equivalent to the length in the third direction Z. The thickness T1 is equivalent to a distance from the main surface 10A to the main surface 10B, the thickness T2 is equivalent to a distance from the main surface 20A to the main surface 20B, the thickness T3 is equivalent to a distance from the main surface 30A to the main surface 30B, and the thickness T10 is equivalent to a distance from the surface 1A to the surface 1B. In the example illustrated, the thickness T1 is similar to the thickness T2, and the thickness T3 is similar to the thicknesses T1 and T2. Note that the thickness T3 may be different from the thicknesses T1 and T2. The thickness T10 is greater than any one of the thickness T1 to the thickness T3. A height H1 taken from the main surface 10B to the surface 1B is less than a height H2 taken from the main surface 10B to the main surface 30B in the third direction Z. Further, a height H3 taken from the main surface 10B to the surface 1A is greater than a height H4 taken from the main surface 10B to the main surface 20A in the third direction Z. In other words, the surface 1D is located between the main surface 20A and the main surface 30B along the third direction Z. The light emitted from the light-emitting portion EM1 enters the light guide LG1 from the surface 1C and proceeds in the light guide LG1 while being reflected on the surface 1A and the surface 1B. The light transmitted in the light guide LG1 is emitted from the surface 1D and enters the transparent substrate 20 and the transparent substrate 30 from the end portion E21 and the end portion E31, respectively.

According to this embodiment, the light guide LG1 comprises the surface 1D in a position lower than the main surface 30B in the third direction Z. With this structure, most of the light transmitted in the light guide LG1 is guided to the end portion E21 and the end portion E31, to be able to contribute to display on the display panel PNL, thus suppressing the degradation of the light-entering efficiency.

Further, the reflective member M1 is located between the surface 1B and the wiring substrate F1. Of the light transmitted in the light guide LG1, a light having passed the surface 1B is reflected by the reflective member M1 and does not reach the wiring substrate F1. Thus, it is possible to inhibit the light proceeding in the light guide LG1 from being colored by the wiring substrate F1. On the other hand, the reflective member M2 is located between the surface 1A and the metal wiring lines 16. Of the light transmitted in the light guide LG1, the portion having passed the surface 1A is reflected by the reflective member M2 and does not reach the metal wiring lines 16. Thus, it is possible to inhibit the light proceeding in the light guide LG1 from being undesirably scattered by the metal wiring lines 16. Therefore, deterioration in display quality can be suppressed.

Furthermore, the wiring substrate F1 connected to the light-emitting elements LD1 is adhered to the light guide LG1 via the adhesive layer 40, and the light guide LG1 is adhered to the insulating film 15 via the adhesive layer 50. With this structure, the optical unit LU1 can be fixed to the first substrate SUB1 without providing a frame to fix the optical unit LU1, thereby making it possible to lighten the display device DSP in weight.

In the example shown in FIG. 4, the transparent substrates 10 to 30 are equivalent to the first transparent substrate to the third transparent substrate, respectively, the light-emitting element LD1 is equivalent to the first light-emitting element, the light guide LG1 is equivalent to the first light guide, the wiring substrate F1 is equivalent to the first wiring substrate, the adhesive layer 40 is equivalent to the first adhesive layer, the adhesive layer 50 is equivalent to the second adhesive layer, the main surface 10B is equivalent to the first main surface, the main surface 30B is equivalent to the second main surface, the end portion E21 is equivalent to the first end portion, the end portion E31 is equivalent to the second end portion, the surface 1A is equivalent to the first surface, and the surface 1B is equivalent to the second surface.

Figure 5:
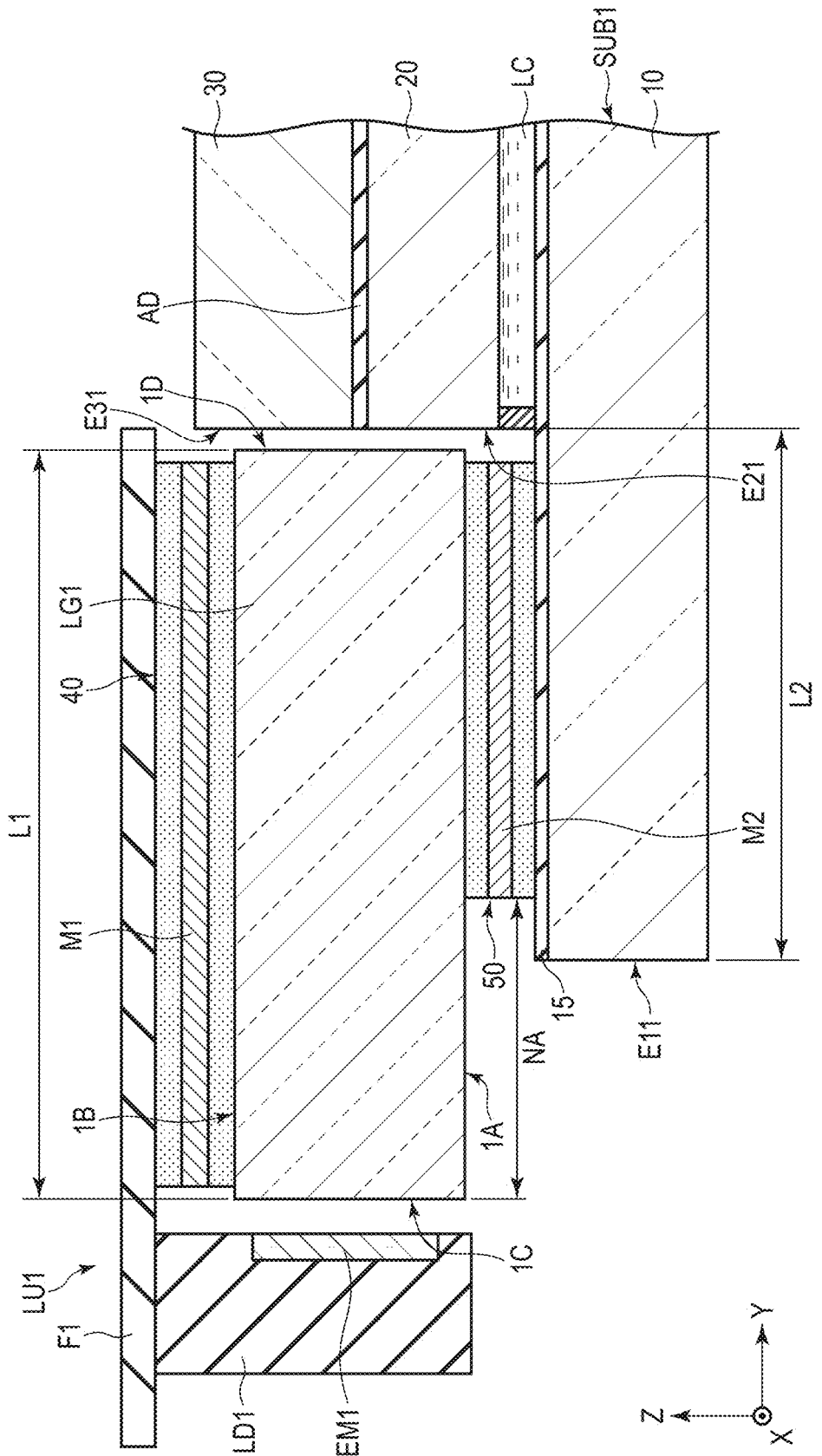
FIG. 5 is a cross-sectional view showing another configuration example of the display device DSP.

FIG. 5 is a cross-sectional view showing another configuration example of the display device DSP. The configuration example shown in FIG. 5 is different from that of FIG. 4 in that a length L1 taken from the surface 1C to the surface 1D in the second direction Y is greater in this example. The length L1 should preferably be, for example, 20 mm or more. The length L1 is greater than a length L2 taken from the end portion E11 to the end portion E21. The end portion E11 is located between the surface 1C and the end portions E21 and E31 in the second direction Y. The surface 1A is in contact with an air layer in an area NA which is not in contact with the adhesive layer 50. With this structure, of the light proceeding in the light guide LG1, a light proceeding to the area NA is reflected by an interface between the air layer and itself.

In such a configuration example as well, an advantageous effect similar to that of shown in FIG. 4 can be obtained. In addition, the length L1 is 20 mm or more. Thus, the distance from the light-emitting portion EM1 to the end portions E21 E31 is long, and therefore the light emitted from the light-emitting portion EM1 is mixed while the light proceeding in the light guide LG1. In this manner, degradation in display quality, which may be caused by the non-uniformity of the illumination light can be suppressed.

In the example shown in FIG. 5, the surface 1D is equivalent to the third surface, and the surface 1C is equivalent to the fourth surface.

FIG. 6 is a cross-sectional view showing still another configuration example of the display device DSP. The configuration example shown in FIG. 6 is different from that of FIG. 4 in that the wiring substrate F1 is located between the light guide LG1 and the transparent substrate 10. The adhesive layer 40 is located between the surface 1A and the wiring substrate F1. The adhesive layer 40 comprises a reflective member M1. The adhesive layer 50 is located between the insulating film 15 and the wiring substrate F1. In the example illustrated, the adhesive layer 50 does not comprise a reflective member. The light guide LG1 is in contact with the air layer in the surface 1B.

In such a configuration example as well, an advantageous effect similar to that of shown in FIG. 4 can be obtained. In addition, in this example, the surface 1B is in contact with the air layer, light is not absorbed by other members in the surface 1B. Therefore, it is possible to suppress degradation of the light-entering efficiency of the light emitted from the light-emitting portion EM1 to the transparent substrates 20 and 30.

Figure 7:
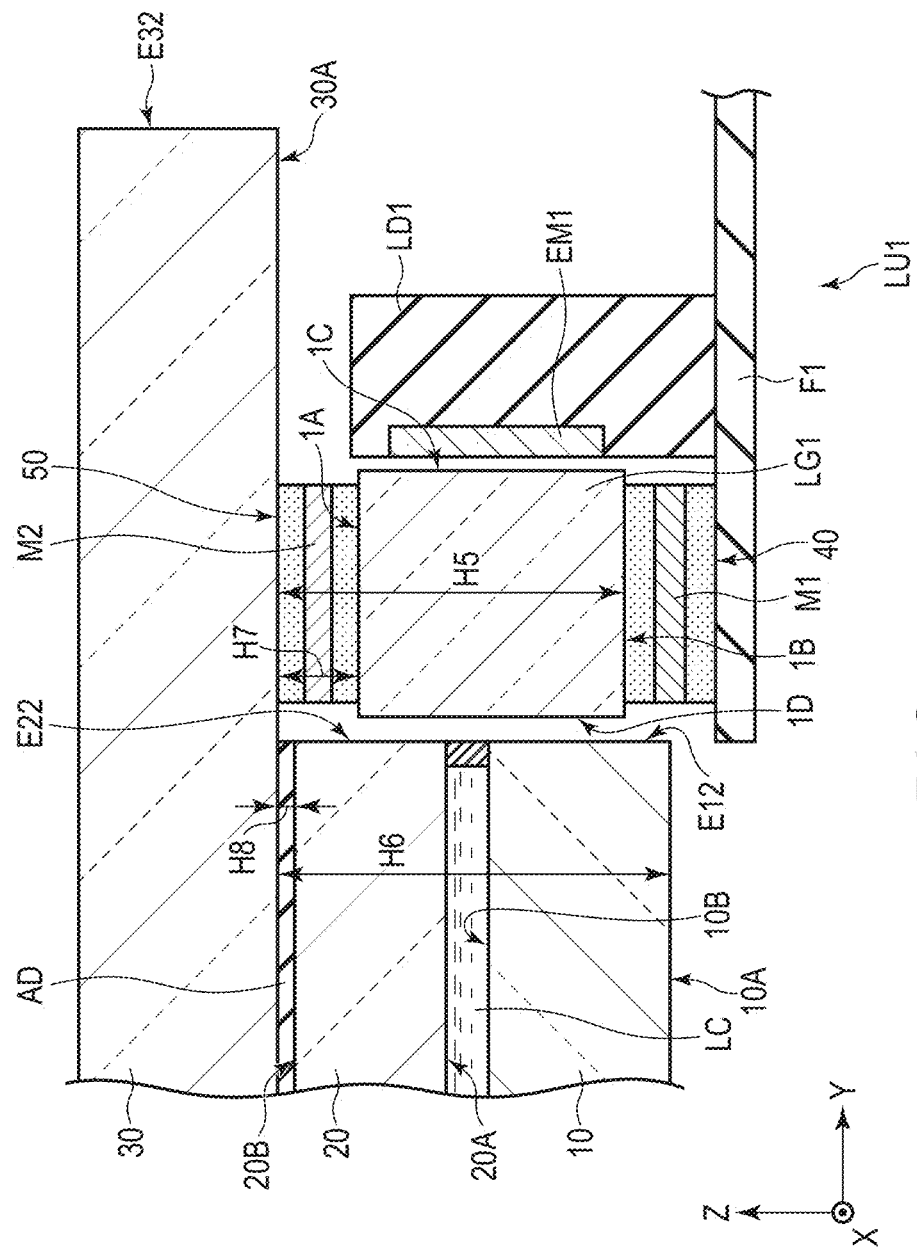
FIG. 7 is a cross-sectional view showing still another configuration example of the display device DSP.

FIG. 7 is a cross-sectional view showing still another configuration example of the display device DSP. The configuration example shown in FIG. 7 is different from that of FIG. 4 in that the light source unit LU1 overlaps the main surface 30A. The end portion E32 does not overlap the end portion E12 and the end portion E22. The light-emitting element LD1 opposes the end portions E12 and E22. The wiring substrate F1 opposes the surface 1B. The adhesive layer 40 is located between the surface 1B and the wiring substrate F1, and adheres the wiring substrate F1 and the light guide LG1 together. The adhesive layer 50 is located between the surface 1A and the main surface 30A, and adheres the light guide LG1 and the transparent substrate 30 together. The reflective member M2 is located between the surface 1A and the main surface 30A. The light guide LG1 overlaps the main surface 30A and is located between the end portions E12 and E22 and the light-emitting element LD1. A height H5 taken from the main surface 30A to the surface 1B is less than a height H6 taken from the main surface 30A to the main surface 10A in the third direction Z. A height H7 taken from the main surface 30A to the surface 1A is greater than a height H8 taken from the main surface 30A to the main surface 20B in the third direction Z. In other words, the surface 1D is located between the main surface 20B and the main surface 10A in the third direction Z.

In such a configuration example as well, an advantageous effect similar to that of shown in FIG. 4 can be obtained.

In the example shown in FIG. 7, the end portion E12 is equivalent to the first end portion, the end portion E22 is equivalent to the second end portion, the main surface 10A is equivalent to the first main surface, the main surface 10B is equivalent to the second main surface, and the main surface 30A is equivalent to the third main surface.

FIG. 8 is a cross-sectional view showing still another configuration example of the display device DSP. The configuration example shown in FIG. 8 is different from that of FIG. 6 in that the light source unit LU1 overlaps the main surface 30A. The wiring substrate F1 is located between the surface 1A of the light guide LG1 and the main surface 30A of the transparent substrate 30. The adhesive layer 40 is located between the surface 1A and the wiring substrate F1, and adheres the light guide LG1 and the wiring substrate F1 together. The adhesive layer 50 is located between the main surface 30A and the wiring substrate F1, and adheres the wiring substrate F1 and the transparent substrate 30 together.

In such a configuration example as well, an advantageous effect similar to that of shown in FIG. 6 can be obtained.

FIG. 9 is a cross-sectional view showing still another configuration example of the display device DSP. The configuration example shown in FIG. 9 is different from that of FIG. 4 in that the display device DSP comprises a light source unit LU2. The light source unit LU2 has a structure similar to that of the light source unit LU1 shown in FIG. 7. The light source unit LU2 comprises a plurality of light-emitting elements LD2, a light guide LG2 and a wiring substrate F2.

The light-emitting elements LD2 oppose the end portion E12 of the transparent substrate 10 and the end portion E22 of the transparent substrate 20. Light emitted from light-emitting portions EM2 of the respective light-emitting elements LD2 proceeds reverse to the direction indicated by the arrow representing the second direction Y. The light-emitting elements LD2 are connected to the wiring substrate F2. An adhesive layer 60 adheres the wiring substrate F2 and the light guide LG2 together. The adhesive layer 60 contains a reflective member M3. An adhesive layer 70 adheres the light guide LG2 and the transparent substrate 30 together. The adhesive layer 70 contains a reflective member M4. The light guide LG2 comprises a surface (an upper surface) 2A, another surface (lower surface) 2B on an opposite side to the surface 2A, a surface 2C and a surface 2D on an opposite side to the surface 2C. The surface 2A opposes the transparent substrate 30, the surface 2B opposes the wiring substrate F2, the surface 2C opposes the light-emitting elements LD2, and the surface 2D opposes the transparent substrate 10 and the transparent substrate 20. The surface 2A and surface 2B are parallel to each other. A height H5 taken from the main surface 30A to the surface 2B is less than a height H6 taken from the main surface 30A to the main surface 10A in the third direction Z.

In the example shown in FIG. 9, the light-emitting elements LD2 are equivalent to the second light-emitting element, the light guide LG2 is equivalent to the second light guide, the wiring substrate F2 is equivalent to the second wiring substrate, the adhesive layer 60 is equivalent to the third adhesive layer, the adhesive layer 70 is equivalent to the fourth adhesive layer, the main surface 10A is equivalent to the third main surface, the main surface 30A is equivalent to the fourth main surface, the surface 2A is equivalent to fifth surface, the surface 2B is equivalent to the sixth surface, the end portion E12 is equivalent to the third end portion, and the end portion E22 is equivalent to the fourth end portion.

Figure 10:
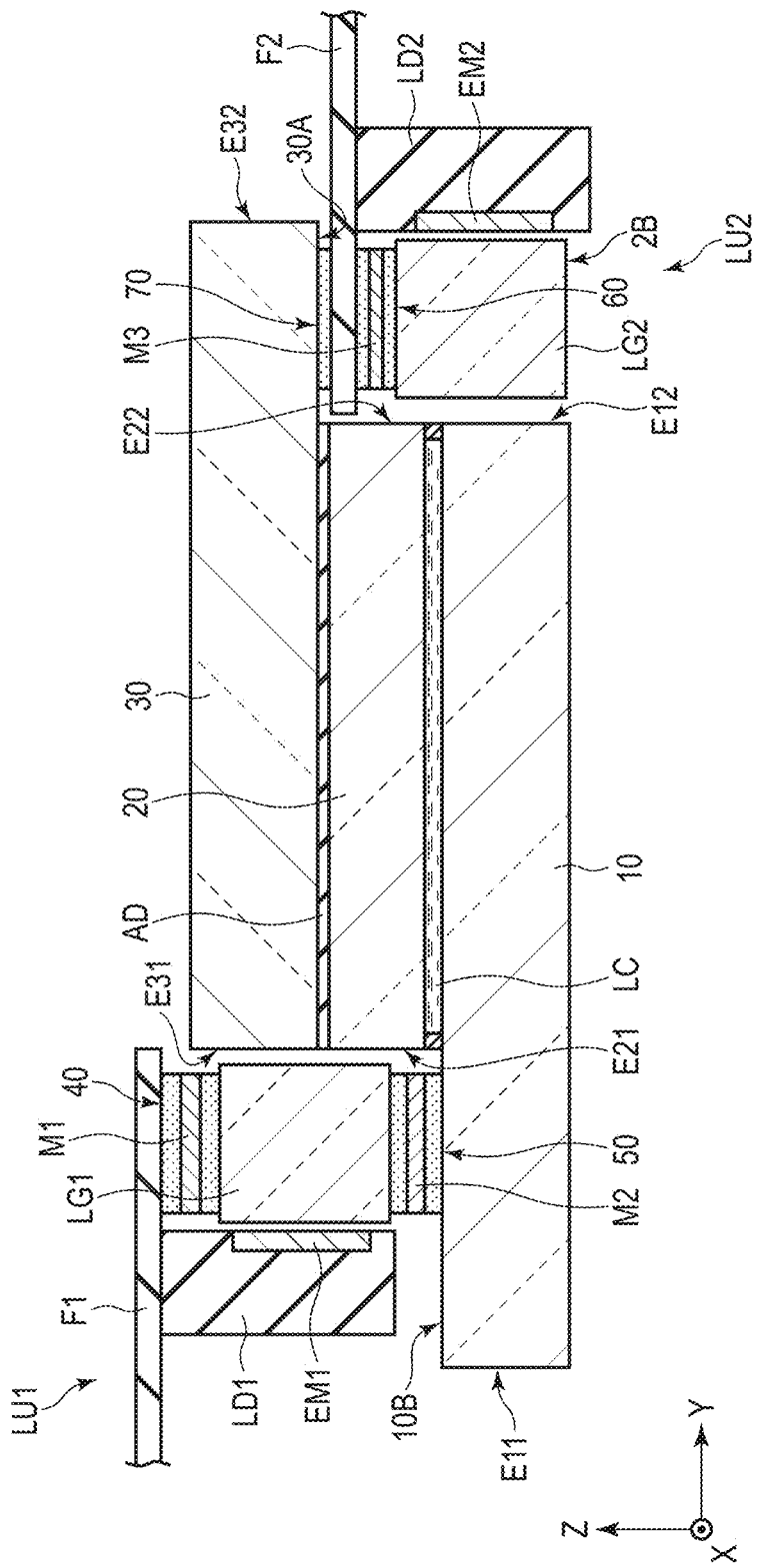
FIG. 10 is a cross-sectional view showing still another configuration example of the display device DSP.

FIG. 10 is a cross-sectional view showing still another configuration example of the display device DSP. The configuration example shown in FIG. 10 is different from that of FIG. 9 in that the wiring substrate F2 is located between the light guide LG2 and the transparent substrate 30. The light source unit LU2 has a structure similar to that of the light source unit LU1 shown in FIG. 8. The adhesive layer 60 contains a reflective member M3. The adhesive layer 70 adheres the wiring substrate F2 and the transparent substrate 30 together. In the example illustrated, the adhesive layer 70 is located between the main surface 30A and the wiring substrate F2. The surface 2B of the light guide LG2 is in contact with the air layer.

Figure 11:
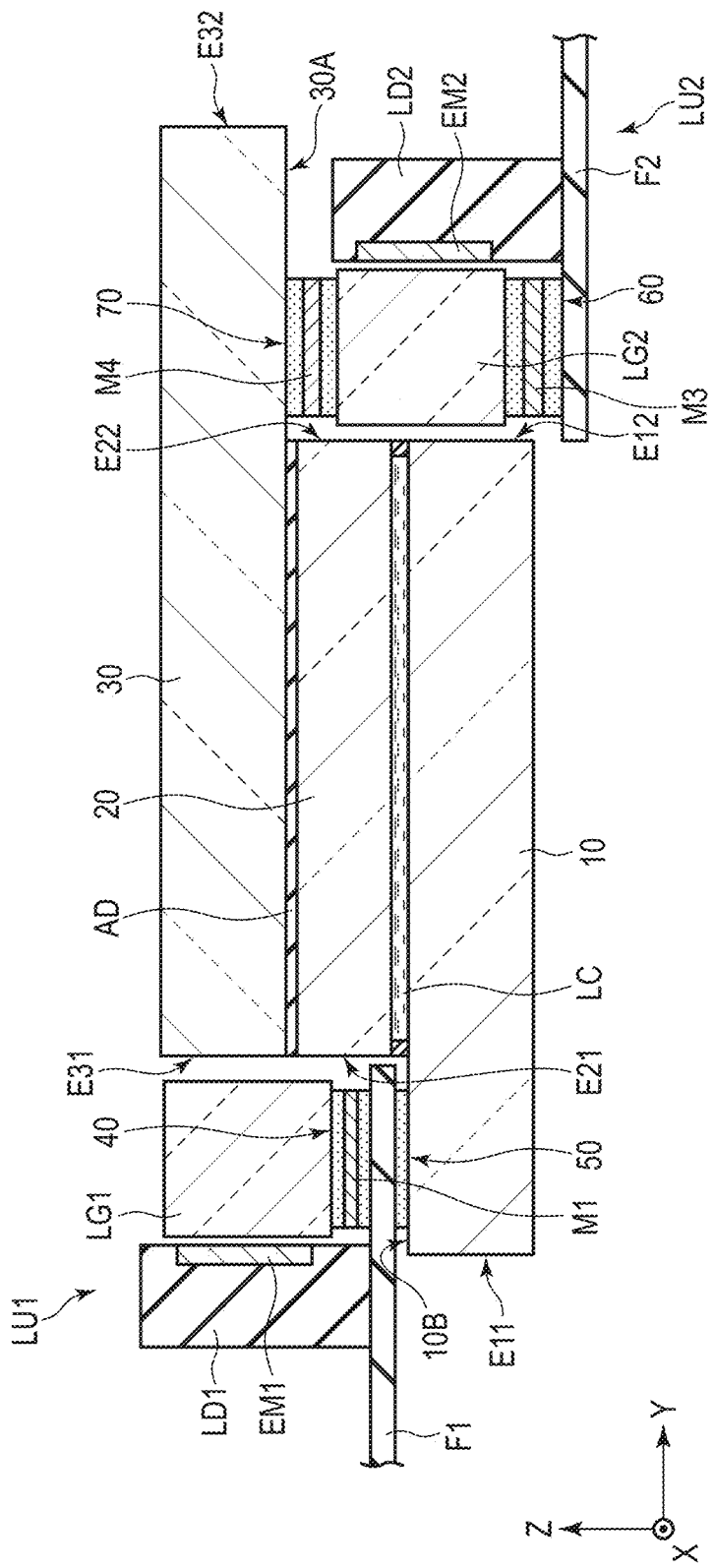
FIG. 11 is a cross-sectional view showing still another configuration example of the display device DSP.

FIG. 11 is a cross-sectional view showing still another configuration example of the display device DSP. The configuration example shown in FIG. 11 is different from that of FIG. 9 in that the light source unit LU1 has a structure similar to that of the light source unit LU1 shown in FIG. 6.

Figure 12:
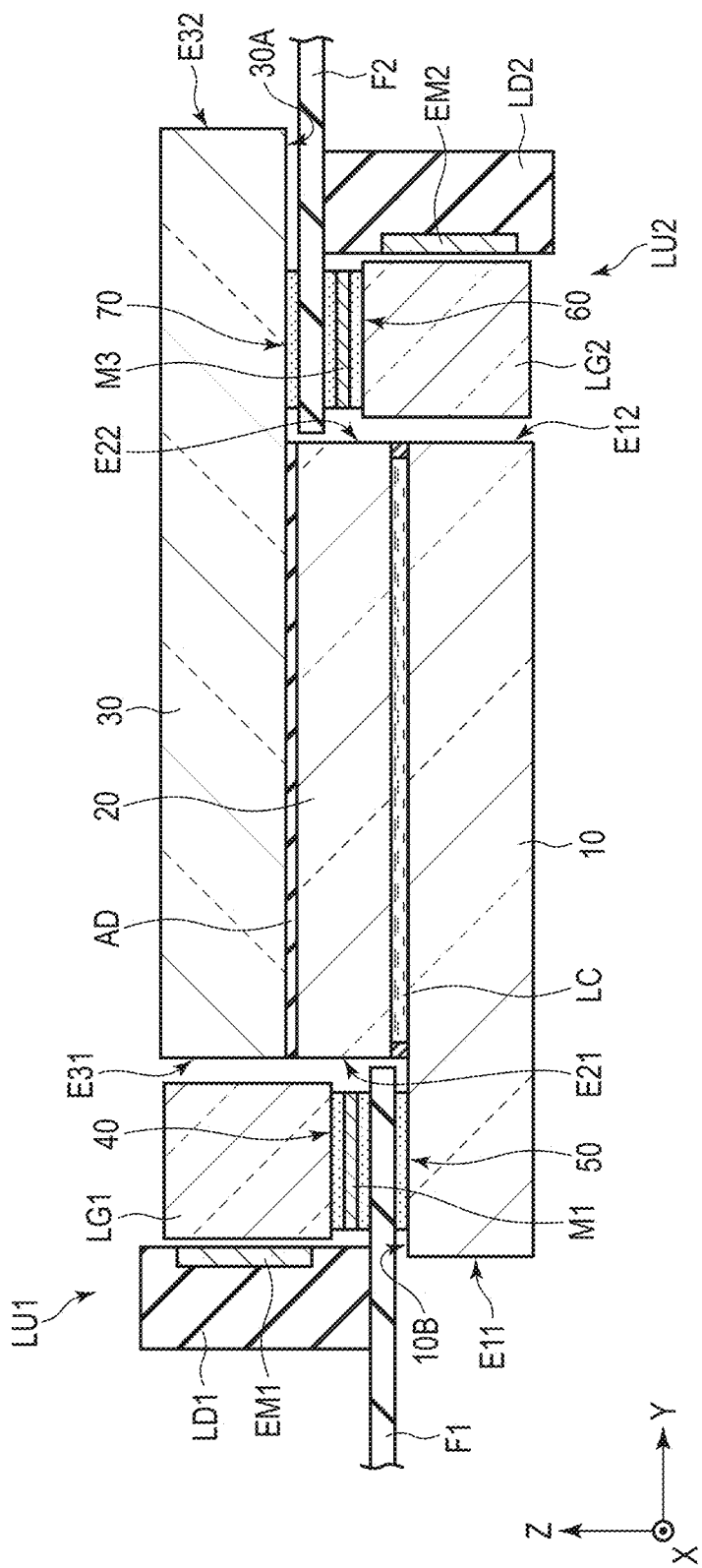
FIG. 12 is a cross-sectional view showing still another configuration example of the display device DSP.

FIG. 12 is a cross-sectional view showing still another configuration example of the display device DSP. The configuration example shown in FIG. 12 is different from that of FIG. 11 in that the light source unit LU2 has a structure similar to that of the light source unit LU1 shown in FIG. 8.

In the configuration examples shown in FIGS. 9 to 12 as well, an advantageous effect similar to that of shown in FIG. 6 can be obtained. Further, in these examples, the light emitted from the light-emitting portion EM2 enters from the end portion E12 and the end portion E22, and therefore the amount of light entering the display panel PNL increases. Thus, even if the display panel PNL is enlarged in size and accordingly the display part DA is expanded, degradation of the brightness can be inhibited over the entire display part DA, and degradation in display quality can be inhibited.

Figure 13:
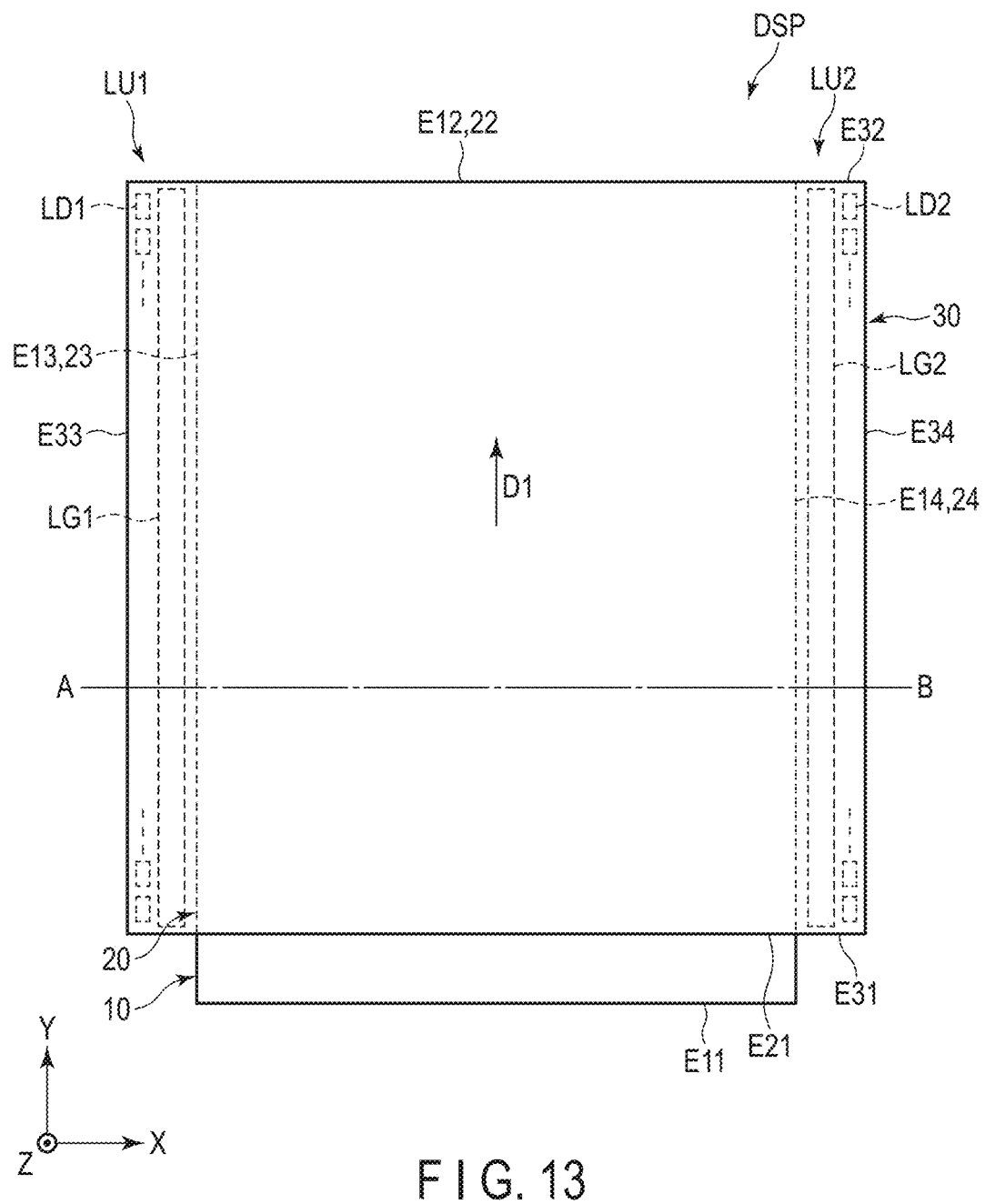
FIG. 13 is a plan view showing still another configuration example of the display device DSP.

FIG. 13 is a plan view showing still another configuration example of the display device DSP. The configuration example shown in FIG. 13 is different from that of FIG. 9 in that the transparent substrate 30 extends along the first direction X, the light source unit LU1 is located between the end portion E23 and the end portion E33, and the light source unit LU2 is located between the end portion E24 and the end portion E34. In the example illustrated, the extending direction D1 of the polymers 31 is parallel to the second direction Y. The end portion E33 does not overlap the end portion E13 and the end portion E23. The end portion E34 does not overlaps the end portion E14 and the end portion E24.

The light-emitting elements LD1 are arranged in the extending direction D1 of the polymer 31 with intervals respectively therebetween. The light guide LG1 is located between the light-emitting elements LD1 and the end portion E23, and extends in the second direction Y. The light-emitting elements LD2 are arranged in the extending direction D1 of the polymers 31 with intervals respectively therebetween. The light guide LG2 is located between the light-emitting elements LD2 and the end portion E24, and extends in the second direction Y.

Figure 14:
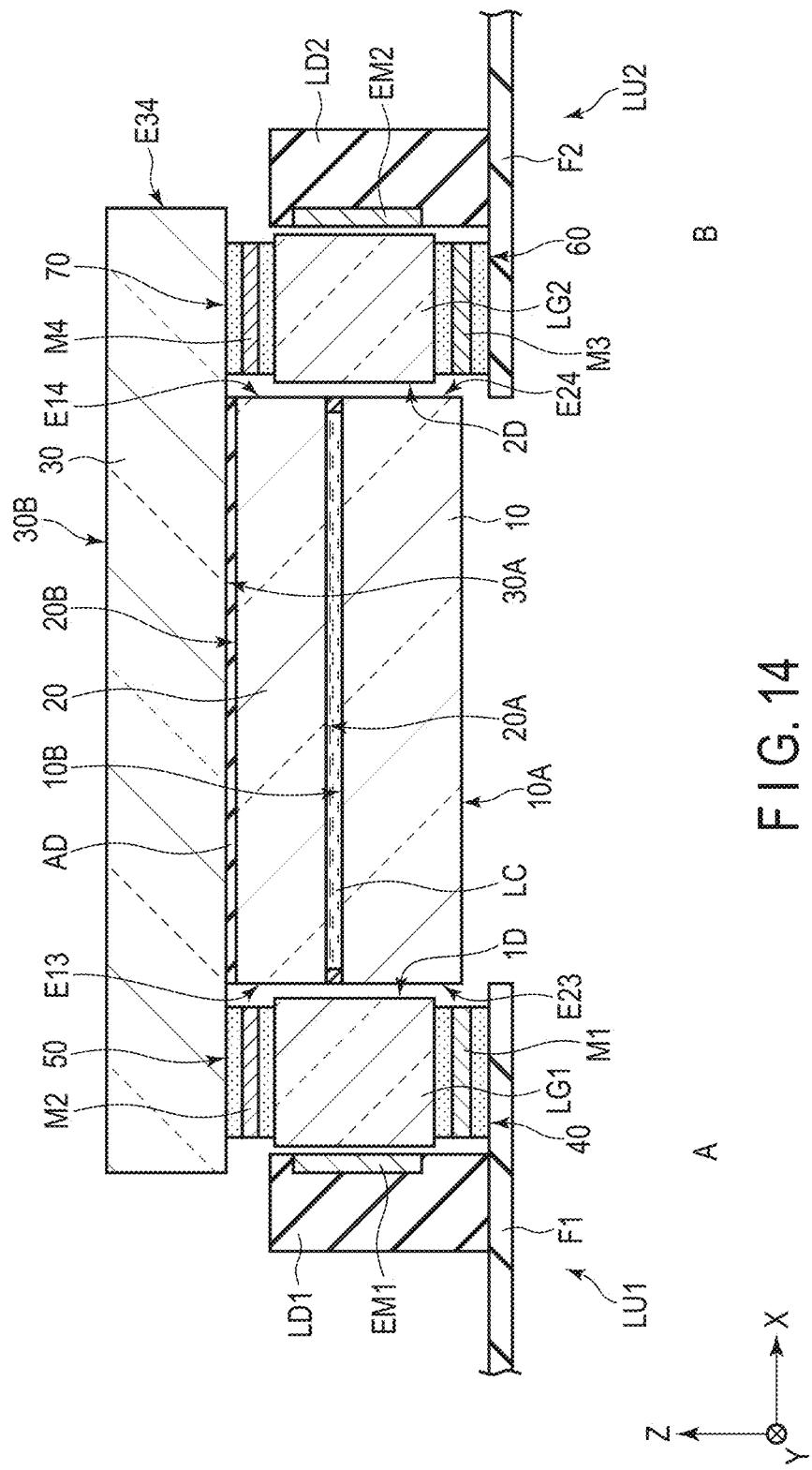
FIG. 14 is a cross-sectional view of the display device DSP taken along line A-B shown in FIG. 13.

FIG. 14 is a cross-sectional view of the display device DSP taken along line A-B shown in FIG. 13. In the example illustrated, the light source units LU1 and LU2 have a structure similar to that of the light source unit LU1 shown in FIG. 7, but they may have a structure similar to that of the light source unit LU1 shown in FIG. 8. The light source unit LU1 and the light source unit LU2 overlap the main surface 30A.

The light-emitting elements LD1 oppose the end portion E13 of the transparent substrate 10 and the end portion E23 of the transparent substrate 20. Light emitted from the light-emitting portions EM1 of the light-emitting elements LD1 proceeds towards a direction indicated by the arrow representing the first direction X. The surface 1D of the light guide LG1 opposes the end portion E13 and the end portion E23. The light emitted from the light-emitting portions EM1 proceeds in the light guide LG1 and enters the transparent substrate and the transparent substrate 20 from the end portion E13 and the end portion E23, respectively.

The light-emitting elements LD2 oppose the end portion E14 of the transparent substrate 10 and the end portion E24 of the transparent substrate 20. The light emitted from the light-emitting portions EM2 of the light-emitting elements LD2 proceed reverse to the direction indicated by the arrow representing the first direction X. The surface 2D of the light guide LG2 opposes the end portion E14 and the end portion E24. The light emitted from the light-emitting portions EM2 proceeds in the light guide LG2 and enters the transparent substrate 10 and the transparent substrate 20 from the end portion E14 and the end portion E24, respectively.

In such a configuration example as well, an advantageous effect similar to that of shown in FIG. 9 can be obtained.

Figure 15:
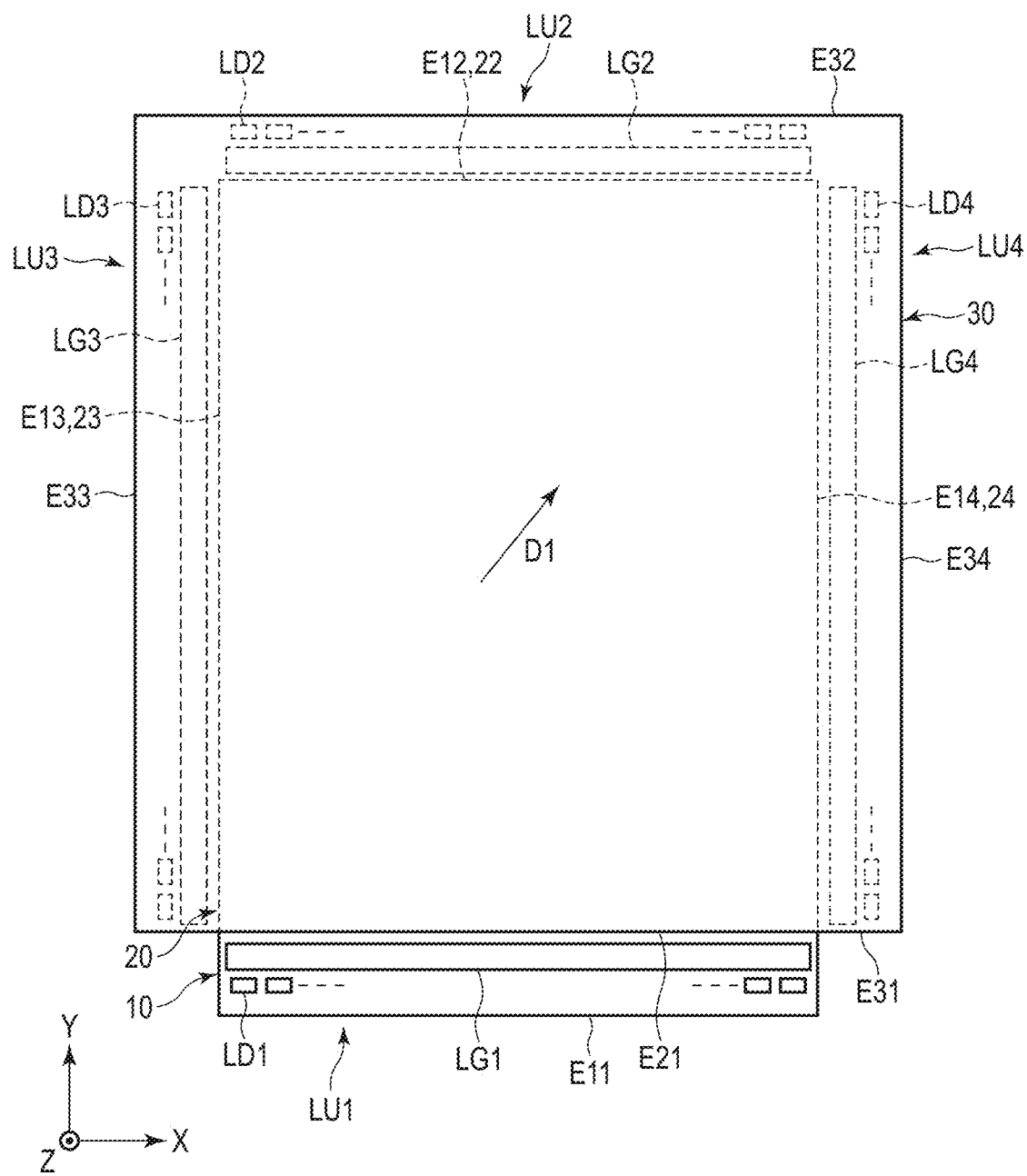
FIG. 15 is a plan view showing still another configuration example of the display device DSP.

FIG. 15 is a plan view showing still another configuration example of the display device DSP. The configuration example shown in FIG. 15 is different from that of FIG. 9 in that the transparent substrate 30 expands in each of the first direction X and the second direction Y, and the display device DSP comprises light source units LU3 and LU4. In the example illustrated, the extending direction D1 of the polymers 31 intersects each of the first direction X and the second direction Y. The end portion E33 does not overlap the end portion E13 and the end portion E23. The end portion E34 does not overlap the end portion E14 and the end portion E24. The light source units LU3 and LU4 have a structure similar to that of the light source units LU1 and LU2 shown in FIG. 13.

In such a configuration example as well, an advantageous effect similar to that of shown in FIG. 9 can be obtained. Further, in this example, the light emitted from the light-emitting elements LD3 enters from the end portion E13 and the end portion E23, and the light emitted from the light-emitting elements LD4 enters from the end portion E14 and the end portion E24, and therefore the amount of light entering the display panel PNL further increases.

Figure 16:
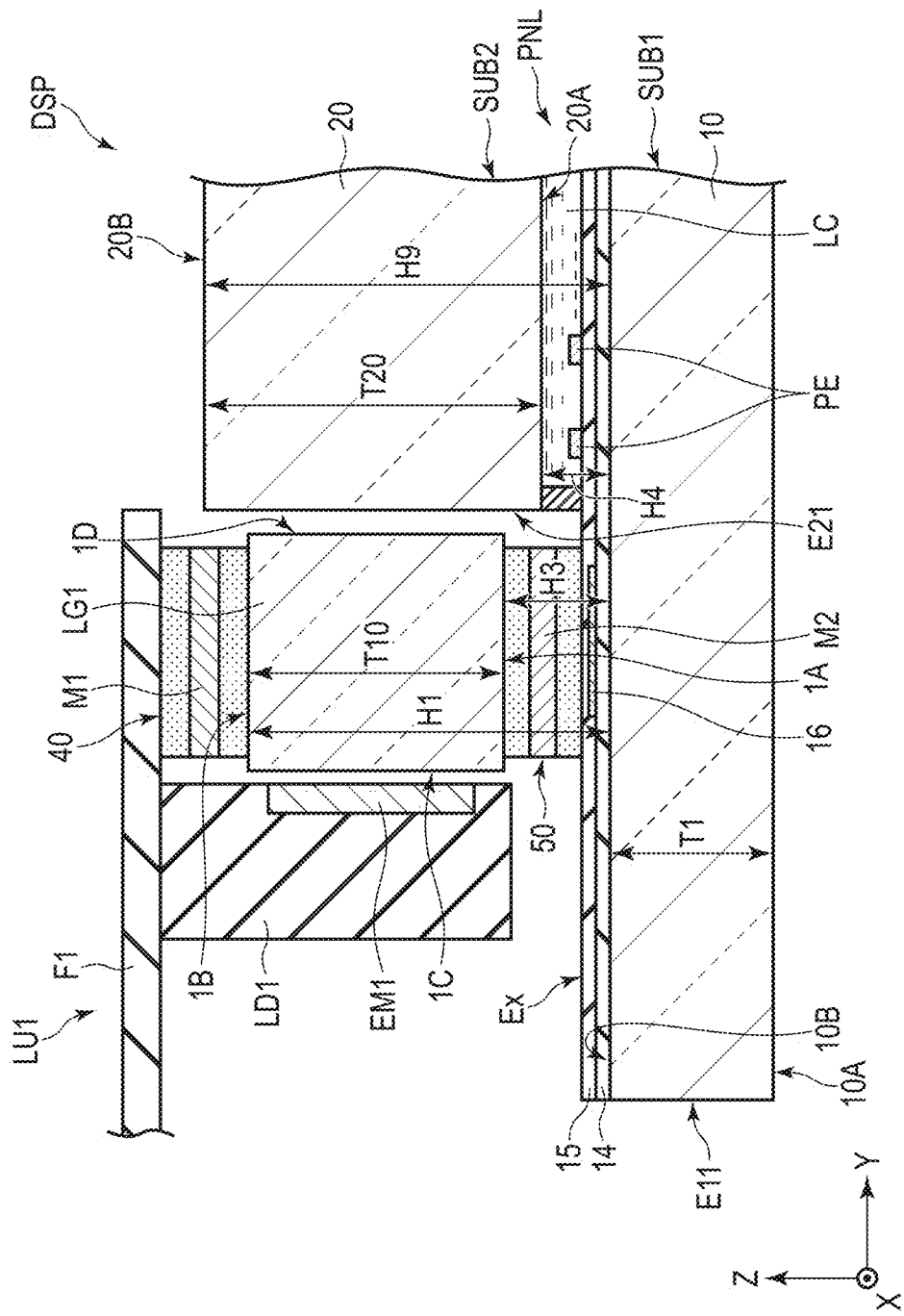
FIG. 16 is a cross-sectional view showing still another configuration example of the display device DSP.

FIG. 16 is a cross-sectional view showing still another configuration example of the display device DSP. The configuration example shown in FIG. 16 is different from that of FIG. 4 in that the transparent substrate 30 is not provided, and the transparent substrate 20 has a thickness T20. The thickness T20 is equivalent to a distance taken from the main surface 20A to the main surface 20B. In the example illustrated, the thickness T20 is greater than each of the thickness T10 and the thickness T1. A height H1 taken from the main surface 10B to the surface 1B is less than a height H9 taken from the main surface 10B to the main surface 20B in the third direction Z. In other words, the surface 1D is located between the main surface 20A and the main surface 20B in the third direction Z. Light emitted from the light-emitting portions EM1 proceeds in the light guide LG1, and is emitted from the surface 1D. Then, the light enters the transparent substrate 20 from the end portion E21. The light source unit LU1 has a structure similar to that of the light source unit LU1 shown in FIG. 4, but it may have a structure similar to that of light source unit LU1 shown in each of FIGS. 5 and 6.

In such a configuration example as well, an advantageous effect similar to that of shown in FIG. 4 can be obtained. Incidentally, in the case where the light emitted from the light-emitting element LD1 proceeds in the light guide LG1 and then enters an adhered member, if the end portion opposing the surface 1D of each member is displaced due to an alignment error between members, degradation of the light-entering efficiency from the light-emitting element LD1 to the display panel PNL may be caused. With regard to this point, according to the configuration example shown in FIG. 16, the light emitted from the light-emitting element LD1 proceeds in the light guide LG1 and enters a single transparent substrate 20, and therefore it is possible to inhibit degradation of the light-entering efficiency from the light-emitting element LD1 to the display panel PNL.

In the example shown in FIG. 16, the main surface 20B is equivalent to the second main surface.

As explained above, according to the present embodiments, a display device which can suppress the deterioration in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first glass substrate comprising a first end portion and a first main surface;
a second glass substrate comprising a second end portion and opposing the first main surface;
a liquid crystal layer located between the first main surface of the first glass substrate and the second glass substrate;
a third glass substrate comprising a third end portion and a second main surface on an opposite side to a surface opposing the second glass substrate, and adhered to the second glass substrate;
a light guide comprising a first surface opposing the third end portion of the third glass substrate and a second surface on an opposite side to the first surface; and
a light-emitting element opposing the second surface of the light guide,
wherein
the first end portion is an end portion that is closer to the light-emitting element in the first glass substrate,
the second end portion is an end portion that is closer to the light-emitting element in the second glass substrate,
the third end portion is an end portion that is closer to the light-emitting element in the third glass substrate,
the second surface is located between the light-emitting element and the first end portion, in plan view,
the second surface is located outside of the first end portion of the first glass substrate, and
the second glass substrate is located between the first glass substrate and the third glass substrate.

2. The display device of claim 1, wherein
the light guide further comprises a third surface parallel to the first main surface of the first glass substrate and a fourth surface on an opposing side to the third surface,
the fourth surface is parallel to the third surface,
the third surface is a surface that is closer to the first main surface in the light guide, and
the fourth surface is a surface that is closer to the second main surface in the light guide.

3. The display device of claim 2, wherein a height from the first main surface to the fourth surface is less than a height from the first main surface to the second main surface.

4. The display device of claim 2, further comprising:
a substrate opposing the fourth surface of the light guide, wherein
the fourth surface is adhered to the substrate by an adhesive layer.

5. The display device of claim 4, wherein
the adhesive layer comprises a reflective member, and
the reflective member is located between the fourth surface and the substrate.

6. The display device of claim 4, wherein a height from the first main surface to the second main surface is less than a height from the first main surface to the substrate.

7. The display device of claim 2, further comprising:
a reflective member,
wherein
the reflective member is adhered to the third surface of the light guide.

8. The display device of claim 1, wherein
the first glass substrate includes an exposed area where the first glass substrate is exposed from the second glass substrate,
the exposed area is between the first end portion and the second end portion, and
a length between the first end portion and the second end portion is less than a length of the light guide between the first surface and the second surface.

* * * * *